United States Patent
Yoo (10) Patent No.: US 8,567,975 B2
(45) Date of Patent: Oct. 29, 2013

(54) MOBILE TERMINAL AND METHOD FOR FABRICATING CASE THEREOF

(75) Inventor: Inseok Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 391 days.

(21) Appl. No.: 13/077,629

(22) Filed: Mar. 31, 2011

(65) Prior Publication Data

US 2012/0055938 A1    Mar. 8, 2012

(30) Foreign Application Priority Data

Sep. 3, 2010   (KR) .......................... 10-2010-0086393

(51) Int. Cl.
*F21V 5/00*   (2006.01)

(52) U.S. Cl.
USPC ............................................ 362/88; 362/605

(58) Field of Classification Search
USPC ....................... 362/311.15, 605, 88
See application file for complete search history.

(56) References Cited

U.S. PATENT DOCUMENTS

| | | | | |
|---|---|---|---|---|
| 7,281,837 | B2 * | 10/2007 | Yue et al. | 362/623 |
| 8,303,151 | B2 * | 11/2012 | Pance et al. | 362/606 |
| 8,350,874 | B2 * | 1/2013 | Lim et al. | 345/690 |
| 2004/0263061 | A1 * | 12/2004 | Ishikawa et al. | 313/501 |
| 2008/0042544 | A1 * | 2/2008 | Park et al. | 313/483 |
| 2011/0065480 | A1 * | 3/2011 | Kim et al. | 455/566 |
| 2011/0119973 | A1 * | 5/2011 | Andre et al. | 40/541 |
| 2012/0244912 | A1 * | 9/2012 | Hiwatashi | 455/566 |
| 2013/0045781 | A1 * | 2/2013 | Tho et al. | 455/575.1 |

* cited by examiner

*Primary Examiner* — Jong-Suk (James) Lee
*Assistant Examiner* — Leah S Macchiarolo
(74) *Attorney, Agent, or Firm* — Birch, Stewart, Kolasch & Birch, LLP (57) ABSTRACT

Disclosed is a mobile terminal and a method for fabricating a case thereof, the mobile terminal comprising a case defining an appearance of the mobile terminal, wherein the case includes a first base formed of a transparent material, a plurality of recess portions recessed into one surface of the first base, and a second base having a surface facing the plurality of recess portions, and disposed to be overlaid on the plurality of recess portions so as to form empty spaces defined by the plurality of recess portions and the surface facing the plurality of recess portions.

21 Claims, 9 Drawing Sheets

MOBILE TERMINAL AND METHOD FOR FABRICATING CASE THEREOF

CROSS-REFERENCE TO RELATED APPLICATIONS

Pursuant to 35 U.S.C. §119(a), this application claims the benefit of earlier filing date and right of priority to Korean Application No. 10-2010-0086393, filed on Sep. 3, 2010, the contents of which is incorporated by reference herein in its entirety.

BACKGROUND OF THE INVENTION

1. Field of the Invention

The present invention relates to a mobile terminal having a case and a method for fabricating a case thereof.

2. Description of the Related Art

Mobile terminals are electronic devices which are portable and have at least one of voice and telephone call functions, information input and/or output functions, a data storage function and the like.

As it becomes multifunctional, the mobile terminal can be allowed to capture still images or moving images, play music or video files, play games, receive broadcast and the like, so as to be implemented as an integrated multimedia player.

Various attempts have been done for the multimedia device by hardware or software in order to implement such complicated functions.

Many users have their mobile terminals to express their own personalities, and accordingly, various designs are required for the mobile terminal. The various designs include structural change (variation, modification) and improvement of outer appearance of the mobile terminal.

The mobile terminal includes a case configuring its appearance. The case may not only simply protect the mobile terminal from external environments but also provide an aesthetic function. As an example of the structural change and improvement, a mobile terminal whose case has various three-dimensional patterns can be considered.

BRIEF SUMMARY OF THE INVENTION

Therefore, an object of the present invention is to provide a mobile terminal capable of exhibiting various three-dimensional patterns on a case thereof, and a method for fabricating the case.

To achieve these and other advantages and in accordance with the purpose of the present invention, as embodied and broadly described herein, there is provided a mobile terminal having a case defining an appearance of the mobile terminal, wherein the case includes a first base formed of a transparent material, a plurality of recess portions recessed into one surface of the first base, and a second base having a surface facing the plurality of recess portions, and disposed to be overlaid on the plurality of recess portions so as to form empty spaces defined by the plurality of recess portions and the surface facing the plurality of recess portions.

In one aspect of the present disclosure, the facing surface of the second base may be planar, and a reflection layer through which the plurality of recess portions are viewed may be formed on the plane.

In another aspect of the present disclosure, the first base may include a transparent layer, and an ultraviolet ray (UV) cured layer formed on one surface of the transparent layer, the UV cured layer formed of a material cured by UV irradiation, wherein the plurality of recess portions are formed on one surface of the UV cured layer.

In another aspect of the present disclosure, the reflection layer may be a coated mirror deposited on the plane.

In another aspect of the present disclosure, the reflection layer may be a mirror film.

In another aspect of the present disclosure, the case may further include a plurality of counter recess portions recessed into the facing surface of the second base in an opposite direction to the plurality of recess portions.

In another aspect of the present disclosure, the plurality of counter recess portions may be symmetrical to the plurality of recess portions based upon a boundary with the plurality of recess portions.

In another aspect of the present disclosure, the plurality of recess portions and the plurality of counter recess portions may be formed in curved shapes along thickness directions of the first and second bases, respectively.

In another aspect of the present disclosure, the case may further include an adhesive layer disposed between the first and second bases, formed of a transparent material and configured to couple the first and second bases to each other.

In another aspect of the present disclosure, the mobile terminal may further include at least one light source mounted adjacent to the case and configured to emit light to the plurality of recess portions.

In another aspect of the present disclosure, the mobile terminal may have a battery mounting portion for mounting a battery therein, the case may be configured to cover the battery mounting portion, and the light source may be disposed adjacent to the battery mounting portion.

In another aspect of the present disclosure, the case may form a front case of the terminal, and the light source may be installed adjacent to the front case.

In another aspect of the present disclosure, a printed circuit board having a controller may be mounted within an inner space formed by the case, and the controller may power the light source on upon reception of a wireless communication signal or a control command.

In another aspect of the present disclosure, a prism may be mounted at the front of the light source to disperse light emitted from the light source into light with different colors.

In another aspect of the present disclosure, the plurality of recess portions may include a first region adjacent to the light source, and a second region defined farther away from the light source than the first region, and the number of recess portions formed on the first region may be smaller than the number of recess portions formed on the second region.

In another aspect of the present disclosure, the plurality of recess portions may include a first region adjacent to the light source, and a second region defined farther away from the light source than the first region, and the width of each recess portion formed on the first region may be narrower than the width of each recess portion formed on the first region.

In another aspect of the present disclosure, the plurality of recess portions may have curved shapes along the thickness direction of the first base to exhibit three-dimensional circular patterns on the case.

In another aspect of the present disclosure, one of the plurality of recess portions may have a width different from that of another recess portion, and the plurality of recess portions may be distributed on the first base.

In another aspect of the present disclosure, the second base may be formed of a transparent material, and a reflection layer may be formed on an opposite surface to the facing surface of the second base, the plurality of recess portions being viewed through the reflection layer.

In one aspect of the present disclosure, a method for fabricating a case of a mobile terminal may include forming a first base having a plurality of recess portions recessed into one surface thereof, forming a second base on a surface facing the plurality of recess portions, the second base having a reflection layer through which the plurality of recess portions are viewed, and coupling the first and second bases to each other such that the reflection layer is overlaid on the plurality of recess portions, wherein the forming of the first base comprises depositing a material cured by ultraviolet ray (UV) irradiation on a mold having a plurality of protrusions corresponding to the plurality of recess portions, or forming the plurality of recess portions by cutting the one surface of the first base.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of preferred configurations of mobile devices according to the present invention, with reference to the accompanying drawings. Hereinafter, suffixes "module" and "unit or portion" for components used herein in description are merely provided only for facilitation of preparing this specification, and thus they are not granted a specific meaning or function.

Mobile terminals described in the present invention may include smart phones, laptop computers, digital broadcasting terminals, personal digital assistants (PDAs), portable multimedia players (PMPs), E-books, navigators, and the like.

Figure 1:
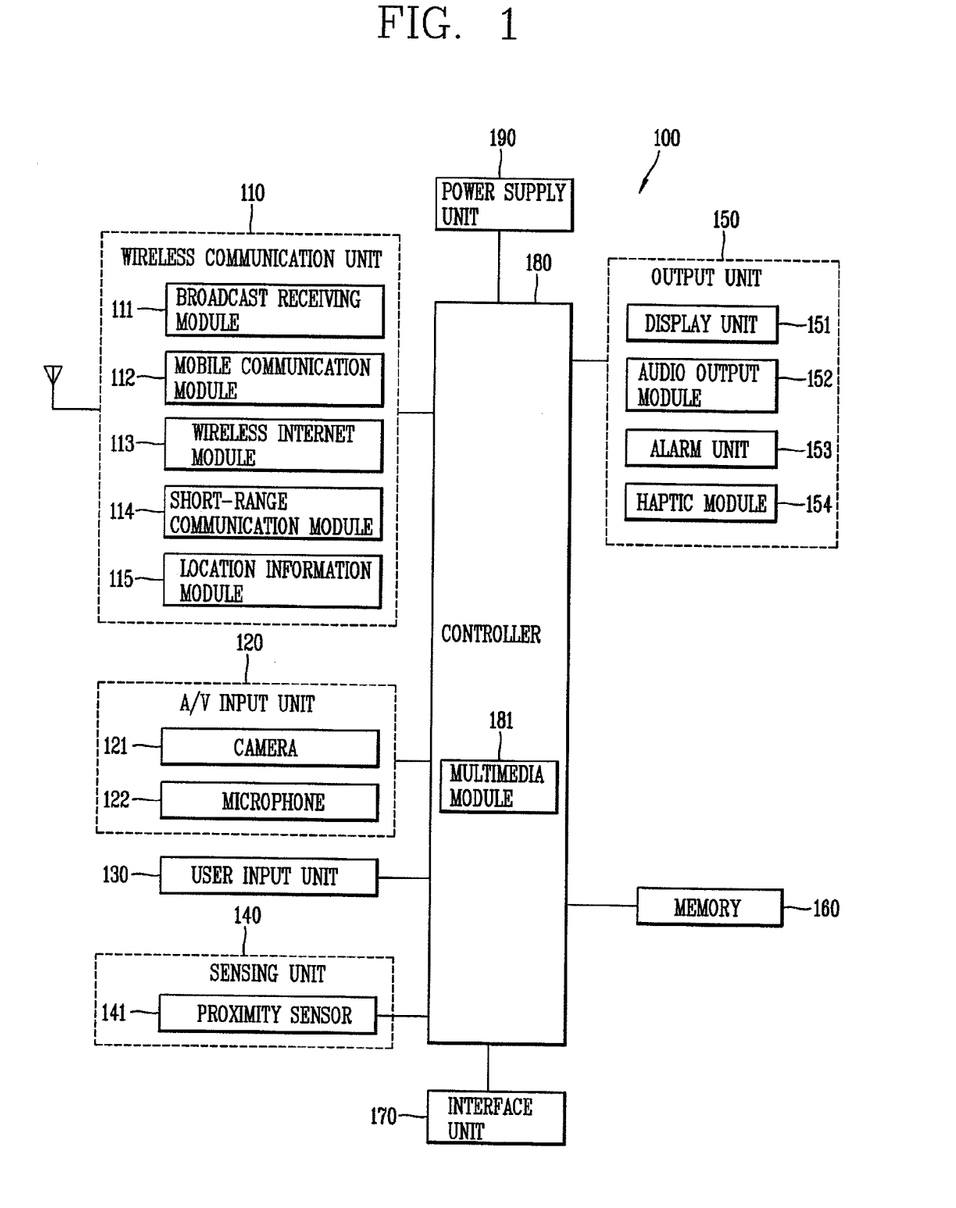
FIG. 1 is a block diagram of a mobile terminal in accordance with one exemplary embodiment.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Meanwhile, the sensing unit 140 may include a proximity sensor 141.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
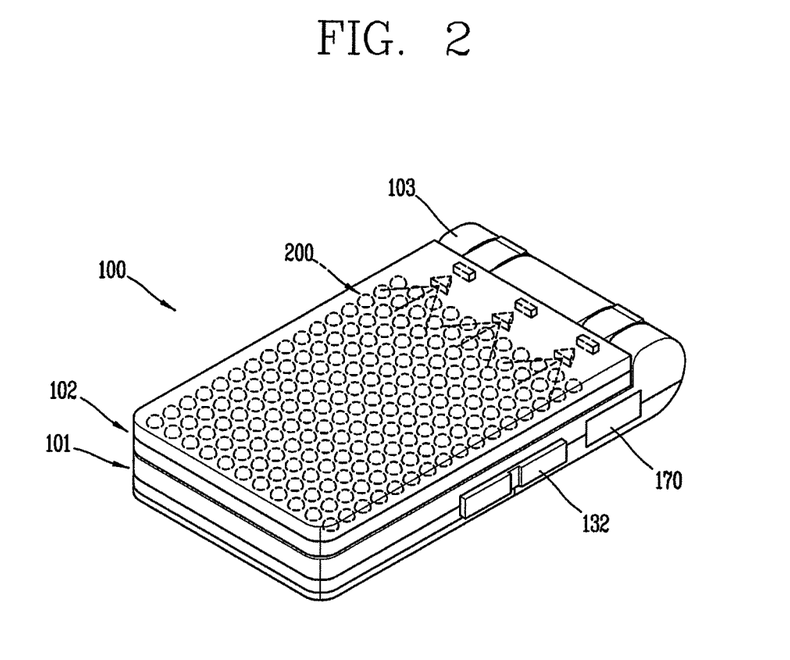
FIG. 2 is a perspective view showing a closed state of the mobile terminal.
Figure 3:
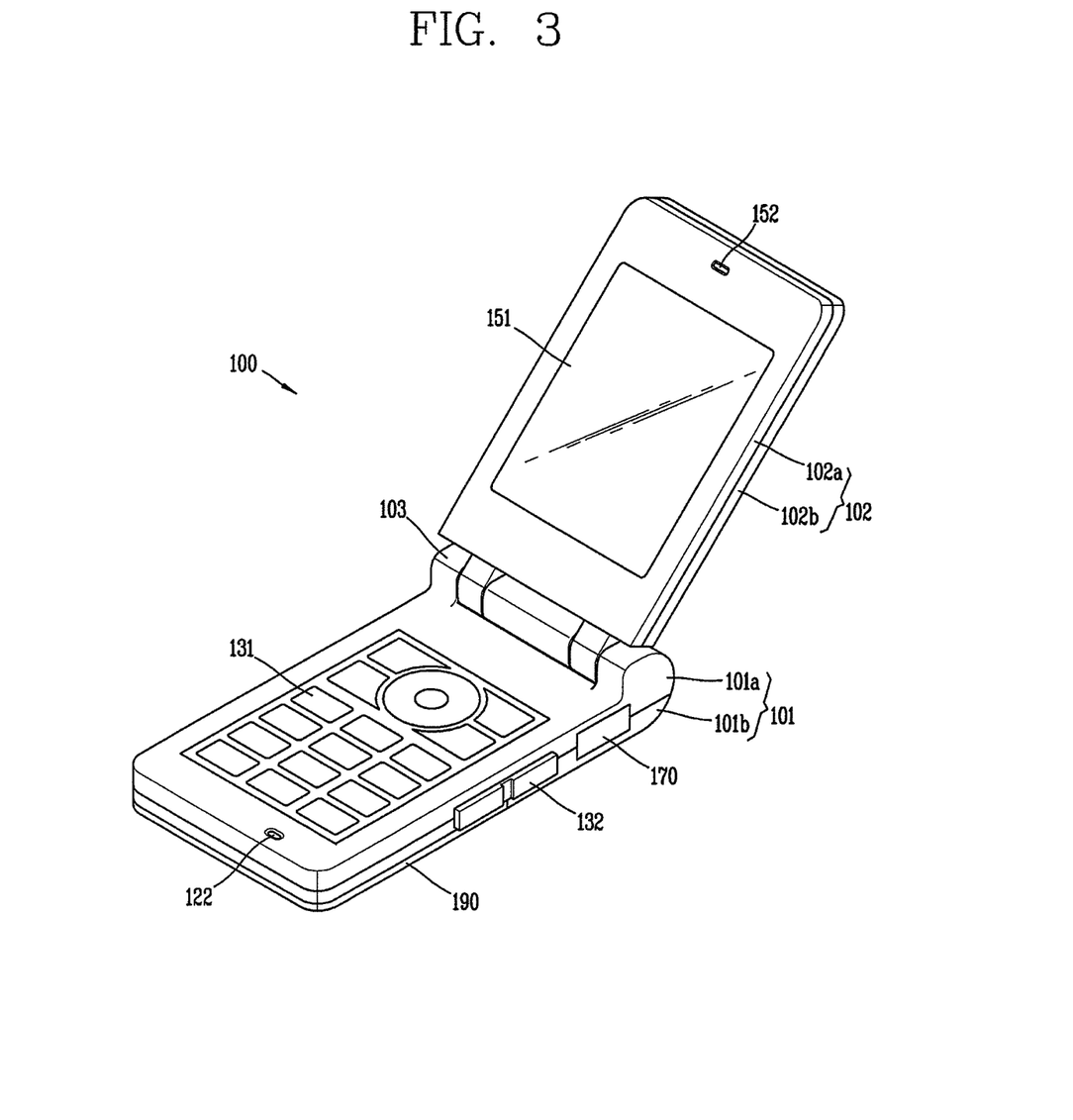
FIG. 3 is a perspective view showing an open state of the mobile terminal shown in FIG. 2.

FIGS. 2 and 3 are perspective views showing one example of the mobile terminal 100. FIG. 2 shows a closed state of the mobile terminal 100, and FIG. 3 shows an open state of the mobile terminal 100.

The mobile terminal 100 shown in FIGS. 2 and 3 is a fold type mobile terminal. However, this detailed description may be applicable, but not limited to various structures, such as a bar type, a slide type, a swing type, a swivel type and the like having two or more bodies coupled to be relatively movable with each other.

As shown in FIGS. 2 and 3, the mobile terminal 100 may include a first body 101, and a second body 102 having at least one side that is foldable or unfoldable with respect to the first body 101.

Referring to FIG. 2, when the first body 102 is placed over the second body 102, namely, when the first and second bodies 101 and 102 are overlapped with each other, this may be referred to as a closed configuration. In the closed configuration, the first and second bodies 101 and 102 are disposed to face each other. Hereinafter, the portions facing each other in the closed configuration is referred to front surfaces of the first and second bodies 101 and 102. Referring to FIG. 3, a state where the first and second bodies 101 and 102 are relatively rotated away from each other may be referred to as an open configuration. Also, portions formed in directions to intersect with the front surfaces may be referred to as side surfaces.

The mobile terminal 100 may be operable in a standby (idle) mode when in the closed configuration, but this mode can be released by the user's manipulation. Also, the mobile terminal 100 may typically be operable in an active (phone call) mode in the open configuration. Here, this mode may be changed into the idle mode according to the user's manipulation or after a certain time elapses.

Functions or components may be disposed on one surfaces of the first and second bodies 101 and 102 in various structures depending on an intensive function or an inquired user interface studied in the mobile terminal 100. As one example, referring to FIG. 3, the display unit 151 may be installed on one surface of the second body 102, and the user input unit 131 may be installed on one surface of the first body 101. Hereinafter, the one surfaces of the first and second bodies 101 and 102 having the user input unit 131 and the display unit 151, respectively, may be referred to as front surfaces.

Still referring to FIG. 3, a case (casing, housing, cover, etc.) defining an outer appearance of the first body 101 may be formed with a front case 101a and a rear case 101b. A space formed between the front case 101a and the rear case 101b may accommodate various electric components. At least one intermediate case may further be disposed between the front and the rear cases 101a and 101b. Such cases may be injected using a synthetic resin or be formed of a metal, such as stainless steel (STS), titanium (Ti) or the like.

Similar to the first body 101, the second body 102 may be divided into a front case 102a and a rear case 102b.

The front case 101a of the first body 101 and the front case 102a of the second body 102 are shown having the display unit 151, the audio output module 152, the user input unit 131 and the microphone 122.

When the second body 102 relatively rotates away from the first body 101, the user input unit 131 and the display unit 151, which are disposed on the overlapped front surfaces of the first and second bodies 101 and 102 in the closed configuration (i.e., the state of FIG. 2), are exposed externally.

However, the detailed description may not be limited to this structure, and the user input unit 131 may be replaced with an auxiliary display unit. In this structure, the display unit 151 and the auxiliary display unit may configure a dual display which are divided into a plurality of regions to display one image information on the plurality of divided regions.

The display unit 151 may include a display module, for example, an LCD module, an OLED module, a TOLED module and the like, to display visual information.

The display unit 151 may further include a touch screen to allow user's touch input. Also, touch-inputtable numeral keys may be output on the display unit 151 for call connection.

The display unit 151 may be configured to generate various type of tactile effects which the user can feel upon a touch input, and this configuration may be implemented by a haptic module, which cooperatively operates with the display unit 151. A representative example of the tactile effects generated by the haptic module may be vibration. Although being disposed on the display unit 151, the haptic module may be disposed in various manners according to the structure of the mobile terminal 100.

The user input unit 131 may be manipulated to allow inputting of commands for controlling operations of the mobile terminal 100, and include a plurality of first manipulation units. The plurality of manipulation units may be referred to as a manipulating portion. Such manipulating portion can employ any tactile manner that a user can touch or tap for manipulation.

For instance, the manipulation portion may be implemented as a dome switch, a touch screen, a touchpad or the like by which a user can input commands or information in a pushing or touching manner. Alternatively, the manipulating portion may be implemented as a wheel or a jog which rotates keys or a joystick.

The first and second manipulation units may be set to a low inputting of various contents. For example, the first manipulation unit may be configured to input commands such as START, END, SCROLL or the like, and the second manipulation unit may be configured to input numbers, letters (characters), symbols or the like.

The audio output module 152 may be implemented as a receiver or a speaker. The microphone 122 may be disposed symmetrical to the audio output module 152 based upon the display unit 151.

Referring to the drawings, a third manipulation unit 132, an interface unit 170 and the like may be disposed on one side surface of the first body 101.

The third manipulation unit 132 can be worked as a hot key which performs a specific function, such as activating a camera 121 (see FIG. 4), and the like. The third manipulation unit 132 may configure the user input unit 131 together with the first and second manipulation units.

The interface unit 170 may generally be implemented to interface the mobile terminal 100 with external devices. The interface unit 170 may allow data exchange and the like with the external devices. The interface unit 170 may be at least one of, for example, wired/wireless earphone access ports, ports for short-range communications (e.g., IrDA port, Bluetooth port, Wireless LAN port, etc.) or power supply ports for power supply to the mobile terminal.

The interface unit 170 may be a card socket for accommodating an external type card, such as a User Identity Module (UIM), a Subscriber Identity Module (SIM), a memory card for storage of information and the like.

A broadcast signal receiving antenna may further be disposed at one side of the body 101 or 102 in addition to an antenna for communications, for example. The antenna may be retractable into the first or second body 101 or 102.

Figure 4:
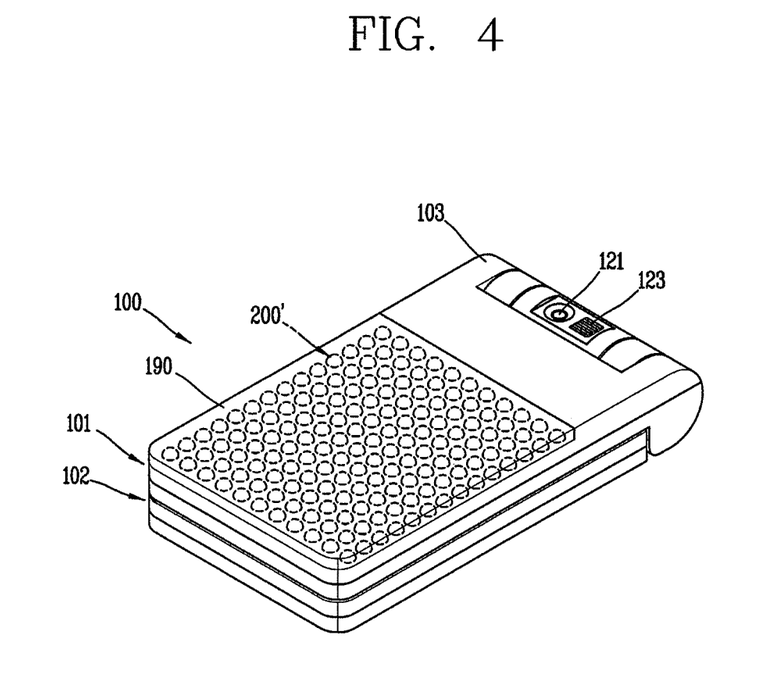
FIG. 4 is a rear perspective view of the mobile terminal shown in FIG. 2.

FIG. 4 is a rear perspective view of the mobile terminal 100 shown in FIG. 2.

The first body 101 is shown having a power supply unit 190 for supplying power to the mobile terminal 100. The power supply unit 190 may be configured as a rechargeable battery to be attachable for charging.

The camera 121 may be installed in a hinge portion 103 by which the second body 102 is rotatably coupled to the first body 101. The camera 121 may be implemented as a type of camera module for photographing image or video of a user and the like. A camera 121 can be implemented to be rotatable.

The flash 123 may further be disposed adjacent to the camera 121. The flash 123 may emit light toward an object when capturing the object using the camera 121.

Hereinafter, a case of the mobile terminal 100, which can exhibit various three-dimensional patterns, will be described in more detail.

Figure 5:
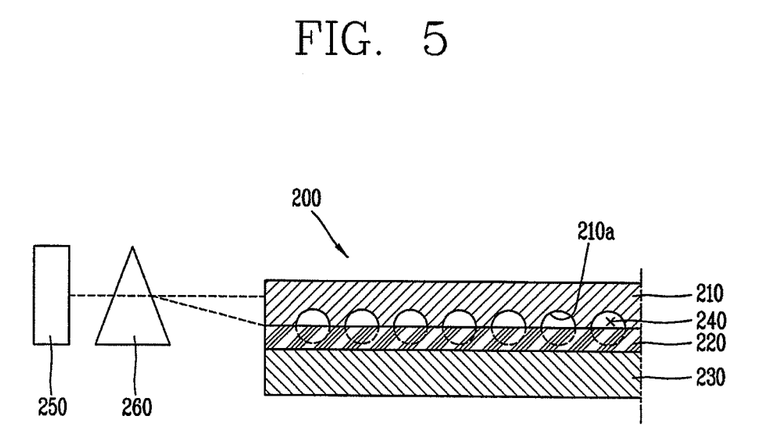
FIG. 5 is a sectional view showing one embodiment of a case shown in FIGS. 2 and 4, viewed from a side surface.

FIG. 5 is a sectional view showing one embodiment of the cases 200 and 200' shown in FIGS. 3 and 4 viewed from a side surface.

The case 200 may form an appearance of a terminal body. The case 200 may configure at least one body of the first and second bodies 101 and 102 shown in FIG. 3. The case 200 may be either the rear case 101b of the first body 101 or the rear case 102b of the second body 102.

Referring to FIG. 5, the case 200 may include a first base 210 and a second base 230 disposed to cover one surface of the first base 210. The first base 210 may define an outer surface of the terminal body. A protection layer, which covers the first base 210, may further be disposed on one surface of the first base 210.

The first base 210 may be formed of a transparent material. Here, transparency may include transparency that light is entirely transmitted through the material, and be semi-transparency that light is partially transmitted therethrough. For example, the transparent material may be polycarbonate (PC) or polyethylene terephthalate (PET) and the like.

One surface of the first base 210 is shown having a plurality of recess portions 210a recessed into the one surface. The plurality of recess portions 210a may be formed along a thickness direction of the first base 210. The plurality of recess portions 210a may have a curved shape (e.g., hemispherical shape, hemi-oval shape, etc.) to exhibit three-dimensional circular patterns, for example, (hemi)-spherical patterns.

FIG. 5 shows that the plurality of recess portions 210a are formed in a cutting manner. For example, the plurality of recess portions 210a may be formed on the one surface of the first base 210 by Numeric Control (NC) cutting.

The second base 230 may be installed at one surface of the first base 210. The second base 230 may have a surface facing the plurality of recess portions 210a, and the surface is disposed to be overlaid on the plurality of recess portions 210a. As the first base 210 is coupled to the second base 230, empty spaces 240 may be defined by the plurality of recess portions 210a and the surface facing the plurality of recess portions 210a.

The case 200 may have the empty spaces 240 formed by the coupling of the first and second bases 210 and 230. Here, the first base 210 is transparent, which allows fabrication of the mobile terminal 100, which can be presented by virtue of various three-dimensional patterns exhibited on the case 200.

The surface of the second base 230, facing the plurality of recess portions 210a, may be formed planar, and the plane may be provided with a reflection layer 220. As the reflection layer 220 is formed, light transmitted through the plurality of recess portions 210a can be reflected by the reflection layer 220 such that shapes (or patterns) corresponding to the plurality of recess portions 210a may be formed as images on the reflection layer 220, thereby exhibiting three-dimensional patterns on the case 200.

The reflection layer 220, for example, may be a coated mirror deposited on the plane or a mirror film. The first base 210, the reflection layer 220 and the second base 230 may be coupled all together by Optical Clear Adhesive (OCA) or Super Viewer Resin (SVR).

With the structure, the mobile terminal 100 may be allowed to exhibit three-dimensional patterns, for example, water drops, snow, bubble patterns or the like, on the case 200.

Figure 6:
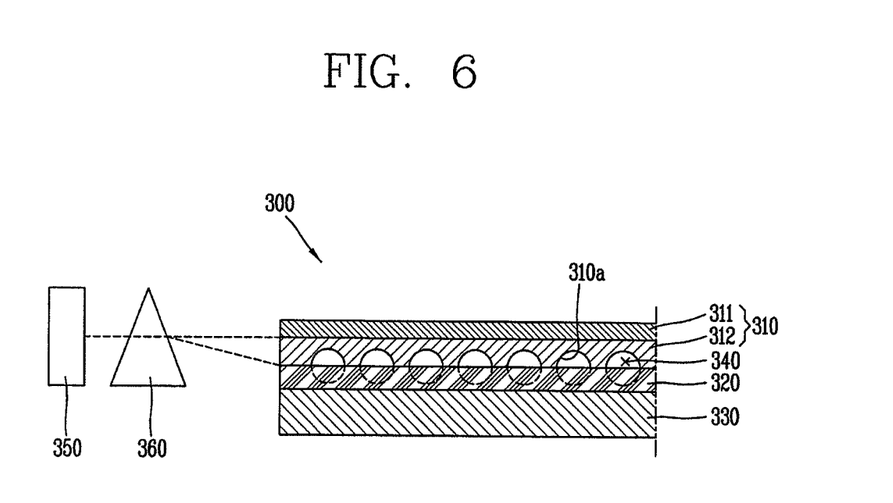
FIGS. 6 to 8 are sectional views showing another embodiments of the case shown in FIG. 3.
Figure 7:
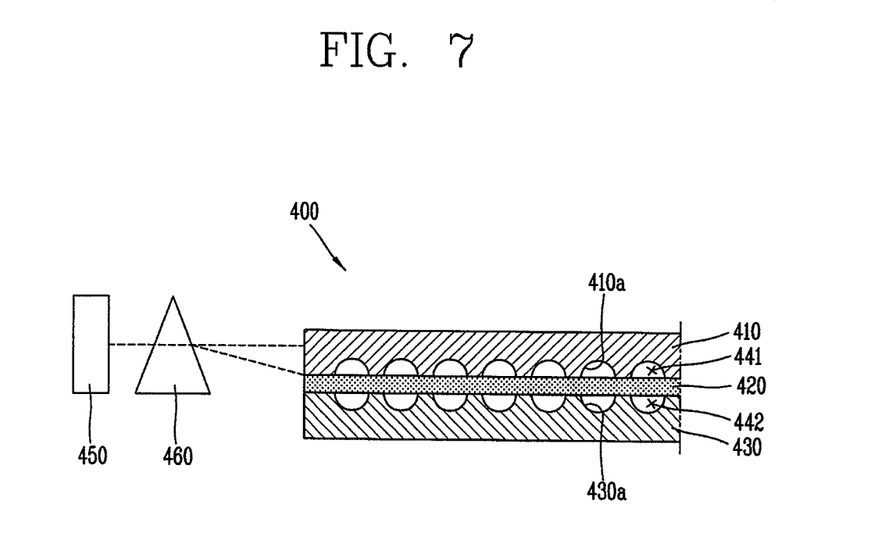
Figure 8:
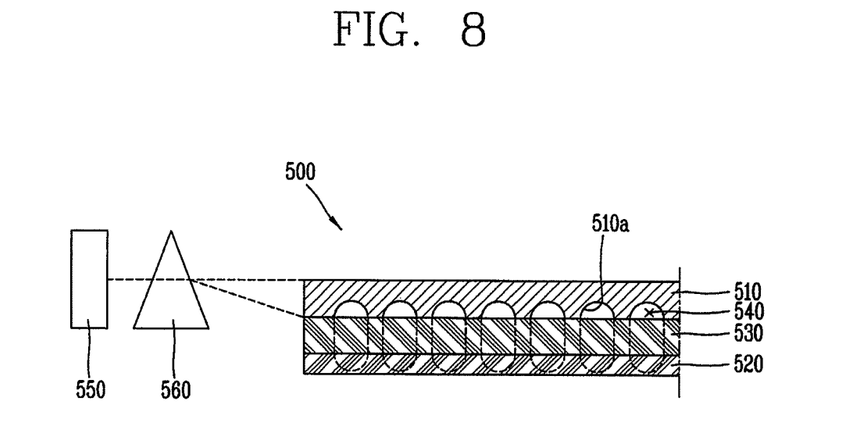

FIGS. 6 to 8 are sectional views showing another embodiments of the case 200 shown in FIG. 3, viewed from a side surface.

Referring to FIG. 6, a case 300 may include a first base 310 having a plurality of recess portions 310a recessed into one surface thereof, and a second base 330 overlaid on the plurality of recess portions 310a.

The first base 310 may include a transparent layer 311 formed of a transparent material, and an ultraviolet ray (UV) cured layer 312 formed on one surface of the transparent layer 311 and made of a material cured by UV irradiation.

The UV cured layer 312 may be UV-molded. In detail, a mold having a plurality of protrusions corresponding to the plurality of recess portions 310a is coated with a material cured by UV irradiation. During this process, a pressing process may be performed to adhere the material onto the mold. Afterwards, the material is cured by irradiating UV and detached from the mold, thereby forming the first base 310 by virtue of UV-molding through inspection and thorough processing.

The transparent layer 311, which is overlaid on the one surface of the UV cured layer 312, as shown in FIG. 6, may be formed of polycarbonate (PC) or polyethylene terephthalate (PET). Especially, use of the PC may facilitate UV-molding and provide an advantage of being endurable to scratches.

The second base 330 may be disposed to be overlaid on the plurality of recess portions 310a, and include a reflection layer 320 formed on a surface facing the first base 310. The second base 330 and the reflection layer 320 formed thereon will be understood by the description with reference to FIG. 5.

Referring to FIG. 7, a case 400 may include a first base 410 having a plurality of recess portions 410a recessed into one surface thereof, and a second base 430 overlaid on the plurality of recess portions 410a. The first base 410, as aforesaid, may also include a transparent material itself or a UV cured layer.

The second base 430 may include a plurality of counter recess portions 430a recessed into its surface facing the first base 410. The plurality of counter recess portions 430a may be recessed in an opposite direction to the plurality of recess portions 410a. Also, the plurality of counter recess portions 430a may be symmetrical to the plurality of recess portions 410a based upon a boundary between the first and second bases 410 and 430.

The plurality of recess portions 410a and the plurality of counter recess portions 430a may have curved shapes in the thickness directions of the first and second bases 410 and 430, respectively. As each of the recess portions 410a and 430a has the curved shape, empty spaces 441 and 442 surrounded thereby may be viewed as three-dimensional circles. Hence, a user can feel like water drops settled on the case 400 by virtue of the empty spaces 441 and 442 formed in the case 400.

The second base 430 may be formed of an opaque material for clearly exhibiting, for example, water drop patterns viewed on the case 400. An adhesive layer 420 formed of a transparent material for coupling the first and second bases 410 and 430 may be disposed between the first and second bases 410 and 430. The adhesive layer 420 may be made of OCA or SVR having transparency.

Referring to FIG. 8, a case 500 may include a first base 510 having a plurality of recess portions 510a recessed into one surface thereof, a second base 530 having one surface overlaid on the plurality of recess portions 510a, and a reflection layer 520 formed on another surface of the second base 530.

The first base 510, as aforesaid, may include a transparent material itself or a UV cured layer. The second base 530 may be made of a transparent (or hemi-transparent) material. A surface of the second base 530 facing the first base 510 and an opposite surface thereto may be formed planar or have various patterns of grooves recessed into a plane.

The reflection layer 520 may be formed on the opposite surface of the second base 530. The reflection layer 520 may be a coated mirror deposited on the plane or a mirror film.

With such structure, light transmitted through the first and second bases 510 and 530 may be reflected by the reflection layer 520 to create a shape with a specific pattern as an image. As a result, a three-dimensional pattern may be exhibited on the case 500.

Figure 9:
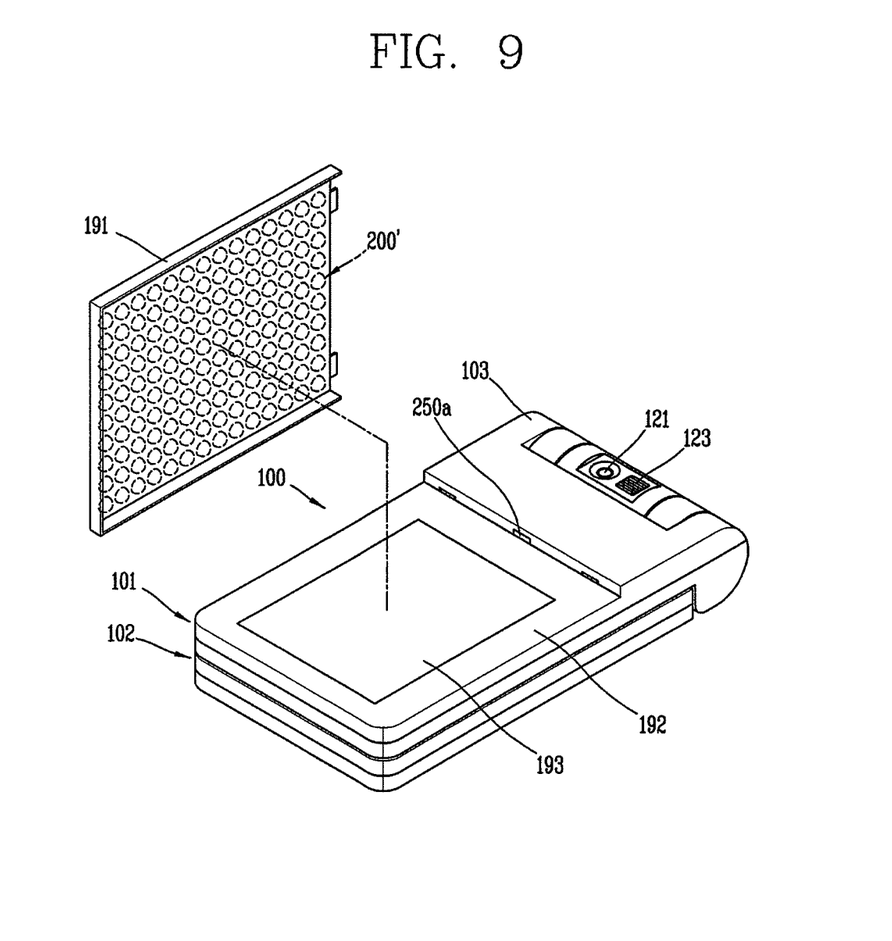
FIGS. 9 and 10 are overviews showing a lighting source emitting light to a battery cover and a prism shown in FIG. 4.
Figure 10:
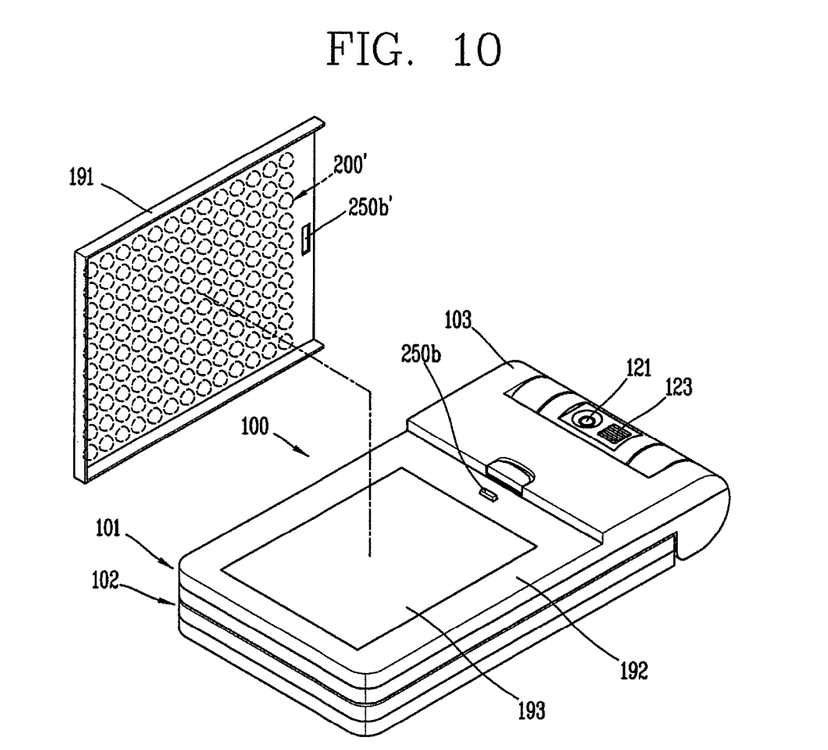

FIGS. 9 and 10 are overviews showing light sources 250a and 250b each for emitting light to a battery cover 191 shown in FIG. 4.

The first body 101 configuring a main body part may be formed as a case with the structure described with reference to FIGS. 5 to 8.

Referring to FIGS. 9 and 10, the first body 101 configuring the main body part may include a battery mounting portion 192 recessed into one surface for mounting the battery 193 therein. A case 200' with the structure may be the battery cover 191 which houses the battery mounting portion 192.

A printed circuit board (PCB) in which various electric components are mounted may be disposed within the first body 101. The PCB may be connected with at least one light source 250a, 250b disposed adjacent to the case 200'.

The light source 250a, 250b may emit light to the plurality of recess portions 210a. The light source 250a, 250b may be provided in plurality to emit light to the battery cover 191. The plurality of light sources 250a, 250b may be dispersed at a lower portion of the case 200'.

The plurality of light sources 250a, 250b may emit light with different colors so as to allow various presentations on the battery cover 191. The light sources 250a, 250b may be Light Emitting Diodes (LEDs).

A prism 260 (see FIG. 5), which is an object for dispersing light emitted from the light source 250a, 250b into light with different colors, may be disposed at the front of the light source 250a, 250b. The prism 260 may be present within the case 200' having the structure so as to be located at the front of the light source 250a, 250b upon coupling the battery cover 191. Accordingly, by virtue of employing the prism 260, even one white light source 250a, 250b can be allowed to emit light with various colors onto the battery cover 191 through the prism 260.

The controller 180 may be configured to supply power to the light source 250a, 250b according to a control command. For example, when a wireless communication module receives a call signal, the controller 180 may render the light source 250a, 250b flickered. Accordingly, the user can recognize the reception or non-reception of the call signal by the light source 250a, 250b flickered at the case 200', namely, a visual effect as well as an audible effect of a ringtone and a tactile effect of vibration.

Also, when the user presses the user input unit 130, for example, the third manipulation unit 132 for more than a preset time, the controller 180 may allow power supply to the light source 250a, 250b. Upon the mobile terminal 100 being completed charged, the controller 180 may also be allowed to supply power to the light source 250a, 250b at every preset time.

The battery cover 191 may be mounted in the battery mounting portion 192 in a sliding manner, or in a manner that in a state of one end being locked in the first body 101, another end is inserted in the first body 101 by being rotated based upon the locked one end.

Referring to FIG. 9, for the sliding type battery cover 191, the light source 250a may be exposed at an inner side wall of the battery mounting portion 192 facing the battery cover 191 upon being mounted to the battery cover 191, thereby emitting light to the battery cover 191.

Referring to FIG. 10, for the inserting type battery cover 191, the light source 250b may be protruded from the battery mounting portion 192, and a housing groove 250b' for housing the protruded light source 250b therein may be formed at the battery cover 191.

Figure 11:
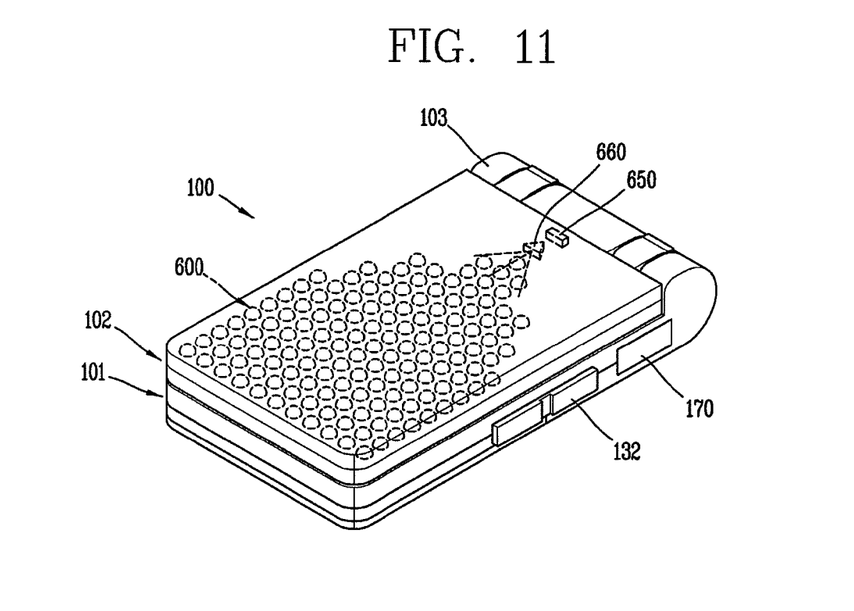
FIGS. 11 to 13 are overviews showing that light emitted from a lighting source is transmitted to a case through a prism in mobile terminals in accordance with another exemplary embodiments.
Figure 12:
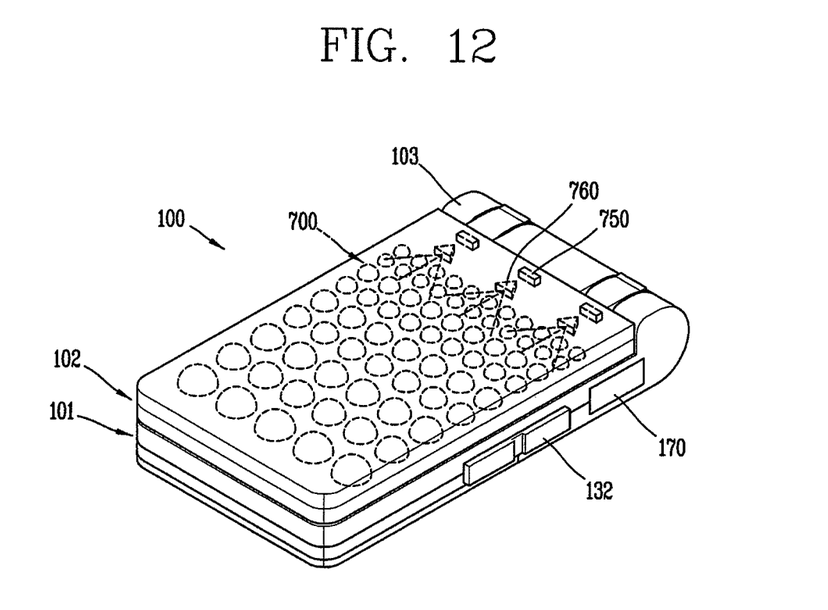
Figure 13:
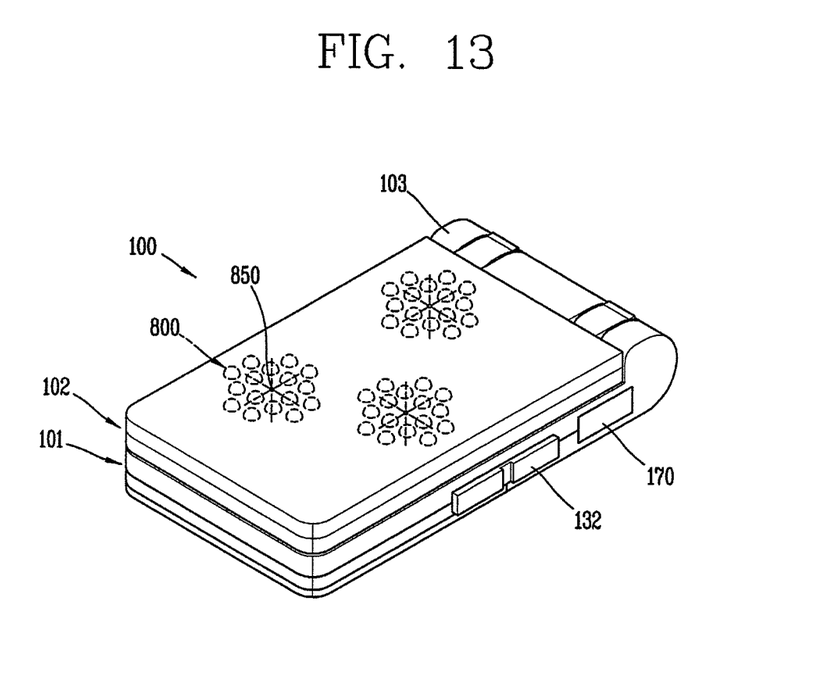

FIGS. 11 to 13 are overviews of another embodiments of the mobile terminal 100, which shows that light is irradiated on the case 600 via a light source 650 and a prism 600.

The second body 102 of a folder part may be implemented as the case in the structure described with reference to FIGS. 5 to 8.

Referring to FIGS. 11 to 13, a case 600, 700, 800 of a folder part 102 may have the above structure, and a light source 650, 750, 850 may be mounted to the second body 102 to emit light to a plurality of recess portions formed in the case 600, 700, 800.

The second body 102 may include a flexible printed circuit board (FPCB) connected to the PCB of the first body 101. At least one light source 650, 750, 850 connected to the FPCB may be disposed within the second body 102. The light source 650, 750, 850, for example, may be disposed adjacent to a hinge portion 103 for rotatably coupling the second body 102 to the first body 101, or be disposed at the center of the second body 102.

A prism 660, 760 may be disposed at the front of the light source 650, 750. The prism 660, 760 may be configured to disperse light emitted from the light source 650, 750 into light with different colors. The prism 660, 760 may be provided in plurality so as to be disposed in correspondence with the plurality of light sources 650, 750, respectively. Alternatively, one prism 660, 760 may be disposed to disperse light emitted from the plurality of light sources 650, 750.

The plurality of recess portions formed at the case 600, 700, 800 may be formed in various patterns to allow various productions of the case 600, 700, 800. This embodiment illustrates, with no limit, that the recess portions have hemispherical, hemi-oval or hemi-rugby ball shapes to allow exhibiting of three-dimensional circular patterns on the case 600, 700, 800. Alternatively, combination of various types of recess portions can be implemented.

The plurality of recess portions may include a first region adjacent to the light source 650, 750, 850, and a second region disposed farther away from the light source 650, 750, 850 than the first region.

Referring to FIG. 11, the number of recess portions formed on the first region may be smaller than the number of recess portions formed on the second region. Alternatively, as shown in FIG. 12, a width of each recess portion formed on the first region may be narrower than a width of each recess portion formed on the second region.

The light source 650, 750 may be disposed adjacent to the first region, and a prism 660, 770 may be disposed at the front of the light sources 650, 750. The controller 180 may control the light source 650, 750 to be powered on or off according to a control command. Upon the light source 650, 750 being powered on, the presentation can be made as if water drops settled on the case 600, 700 spread out.

Furthermore, as shown in FIG. 13, the case 800 may have a structure of a plurality of recess portions surrounding the light source 850. In this structure, an effect as if water drops are spread out with being waved in response to flickering of the light source 850 can be produced.

Figure 14:
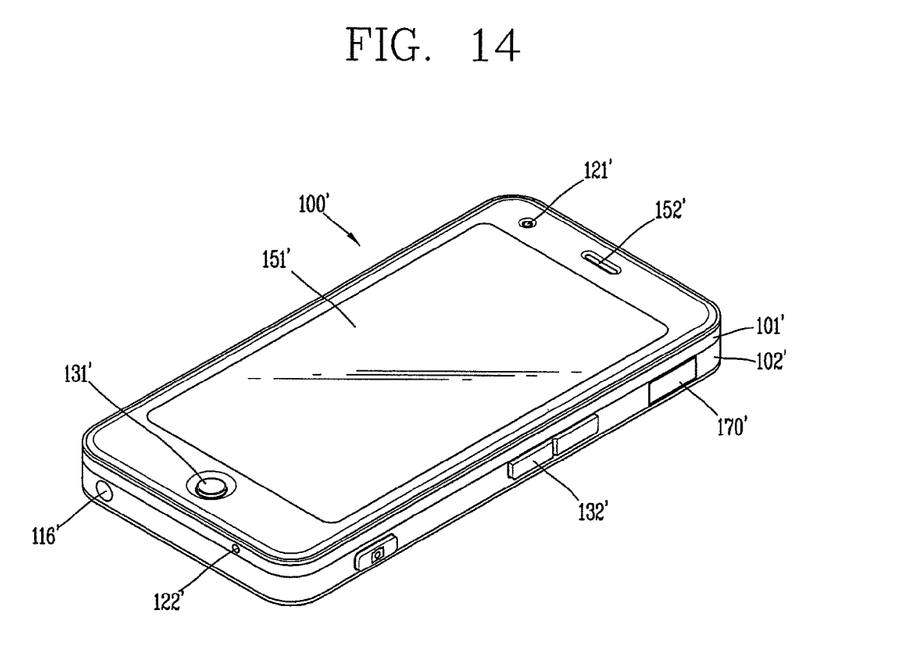
FIG. 14 is a front perspective view of a mobile terminal in accordance with another exemplary embodiment.

FIG. 14 is another embodiment of the mobile terminal 100, which is a front perspective view of the mobile terminal 100.

Referring to FIG. 14, a mobile terminal 100' has a bar-like terminal body.

The body may include a case (housing, casing, cover, etc.) defining an appearance. In this exemplary embodiment, the case may be divided into a front case 101' and a rear case 102'. A space formed between the front case 101' and the rear case 102' may accommodate various electric components. At least one intermediate case may further be disposed between the front and the rear cases 101' and 102'.

Such cases may be injected using a synthetic resin or be formed of a metal, such as stainless steel (STS), titanium (Ti) or the like.

The terminal body, substantially, the front case 101' may include a display unit 151', an audio output module 152', a camera 121', a user input unit 130'/131', 132', a microphone 122', an interface unit 170' and the like.

The display unit 151' may occupy most of a principal surface of the front case 101'. The audio output module 152' and the camera 121' may be disposed at a region adjacent to one of both end portions of the display unit 151', and the user input unit 131' and the microphone 122' may be disposed at a region adjacent to another end portion. The user input unit 132', the interface unit 170' and the like may be present at side surfaces of the front and rear cases 101' and 102'.

The user input unit 130' may be manipulated to allow inputting of commands for controlling operations of the mobile terminal 100', and include a plurality of manipulation units 131' and 132'. The plurality of manipulation units 131' and 132' may be referred to as a manipulating portion. Such manipulating portion can employ any tactile manner that a user can touch or tap for manipulation.

The manipulation units 131' and 132' may be set to allow inputting of various contents. For example, the first manipulation unit 131' may be configured to input commands such as START, END, SCROLL or the like, and the second manipulation unit 132' may be configured to input commands, such as adjusting the volume of sound output from the audio output module 152', switching the display unit 151' to a touch recognition mode, or the like.

Figure 15:
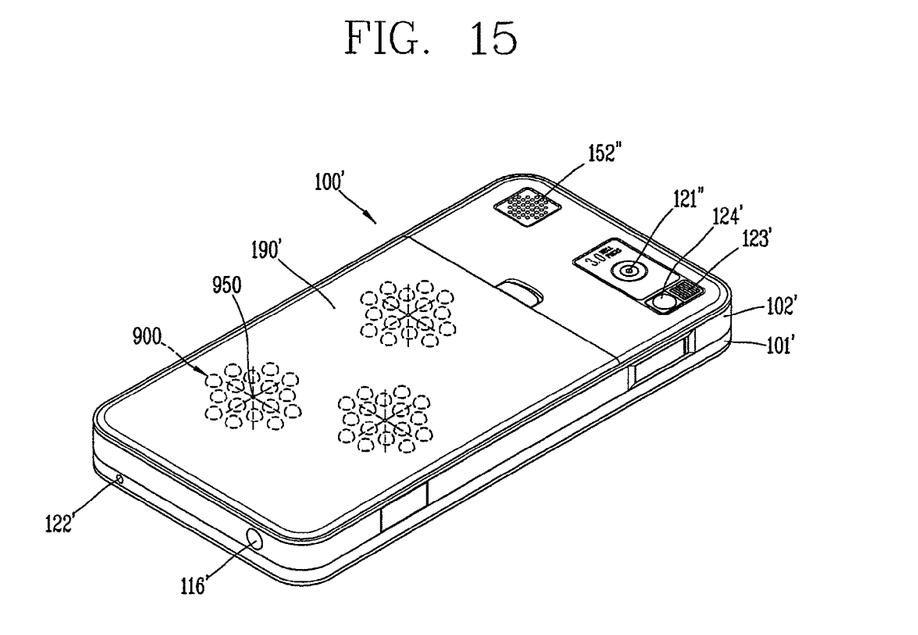
FIG. 15 is a rear perspective view of the mobile terminal shown in FIG. 14.

FIG. 15 is a rear perspective view of the mobile terminal 100' shown in FIG. 14.

As shown in FIG. 15, a rear face of the terminal body, namely, the rear case 102' may further be provided with a camera 121". The camera 121" faces a direction which is opposite to a direction faced by the first camera 121' (see FIG. 14), and may have different pixels from those of the camera 121'.

For example, the camera 121' may operate with relatively lower pixels (lower resolution). Thus, the camera 121' may be useful when a user can capture his face and send it to another party during a video call or the like. On the other hand, the camera 121" may operate with a relatively higher pixels (higher resolution) such that it can be useful for a user to obtain higher quality pictures for later use. The cameras 121' and 121" may be installed in the terminal body to be rotatable or popped up.

A flash 123' and a mirror 124' may additionally be disposed adjacent to the second camera 121". The flash 123' operates in conjunction with the camera 121" when taking a picture using the camera 121". The mirror 124' can cooperate with the camera 121" to allow a user to photograph himself in a self-portrait mode.

An audio output module 152" may further be disposed at a rear surface of the terminal body. The audio output module 152" can cooperate with the audio output module 152' (see FIG. 14) to provide stereo output. Also, the audio output module 152" may be configured to operate as a speakerphone.

A broadcast signal receiving antenna 116' may further be disposed at one side of the terminal body in addition to an antenna for communications, for example. The antenna 116' configuring a part of the broadcast receiving module 111 (see FIG. 1) may be retractable into the terminal body.

A power supply unit 190' for supplying power to the mobile terminal 100' may be mounted in the terminal body. Alternatively, the power supply unit 190' as a rechargeable battery may be detachably coupled to the outside of the terminal body for charging.

At least one of the cases 101' and 102' defining the appearance of the mobile terminal 100' shown in FIGS. 14 and 15 may be implemented as a case having any of the structures described with reference to FIGS. 5 to 13. FIG. 15 exemplarily illustrates that a case 900 having the structure is formed as a battery cover.

With the aforesaid configuration, the case of the mobile terminal can be provided with the empty spaces therein, thereby fabricating the mobile terminal, which can be presented with various three-dimensional patterns exhibited on the case.

Also, the light source and the prism are disposed adjacent to the case and the light source is controlled to be powered on or off according to a control command of the controller, thereby allowing various presentations depending on different situations.

The configurations and methods of the mobile terminal in the aforesaid embodiments may not be limitedly applied, but such embodiments may be configured by a selective combination of all or part of each embodiment so as to derive many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A case for defining an exterior of a mobile terminal, the case comprising:
a first base having a transparent portion and a first surface;
a plurality of recess portions provided in the first surface of the first base; and
a second base having a first surface facing the plurality of recess portions, the second base overlying said first surface of the first base so as to form empty spaces defined by the plurality of recess portions and the first surface of the second base,
wherein the first base in combination with the second base define an external surface of the mobile terminal.

2. The case of claim 1, further comprising a reflection layer provided on the first surface of the second base, the first surface of the second base being substantially planar so as to reflect the plurality of recess portions on the reflection layer when viewed through the first base.

3. The case of claim 2, wherein the first base includes:
a transparent layer; and
an ultraviolet ray (UV) cured layer formed on one surface of the transparent layer, the UV cured layer formed of a material cured by UV irradiation,
wherein the UV cured layer includes the first surface of the first base.

4. The case of claim 2, wherein the reflection layer is a coated mirror.

5. The case of claim 2, wherein the reflection layer is a mirror film.

6. The case of claim 1, further comprises a plurality of counter recess portions provided in the first surface of the second base, the plurality of counter recess portions extending in a direction opposite to the plurality of recess portions.

7. The case of claim 6, wherein the plurality of counter recess portions are arranged symmetrical to the plurality of recess portions based upon a boundary with the plurality of recess portions.

8. The case of claim 6, wherein the plurality of recess portions and the plurality of counter recess portions have curved shapes extending in a direction normal to the first surfaces of the first and second bases, respectively.

9. The case of claim 6, wherein the case further comprises an adhesive layer disposed between the first and second bases, the adhesive layer being formed of a transparent material and configured to couple the first and second bases to each other.

10. The case of claim 1, wherein the plurality of recess portions have curved shapes extending in a direction normal to the first surface of the first base to provide three-dimensional circular patterns on the case.

11. The case of claim 1, wherein one of the plurality of recess portions has a width different from that of another one of the plurality of recess portions.

12. The case of claim 1, further comprising a reflection layer provided on a second surface of the second base opposite the first surface of the second base,
wherein the second base is formed of a transparent material such that the plurality of recess portions, when viewed through the first and second bases, is reflected on the reflection layer.

13. A mobile terminal comprising:
a case including:
a first base having a transparent portion and a first surface;
a plurality of recess portions provided in the first surface of the first base; and
a second base having a first surface facing the plurality of recess portions, the second base overlying said first surface of the first base so as to form empty spaces defined by the plurality of recess portions and the first surface of the second base; and
at least one light source mounted adjacent to the case and configured to emit light to the plurality of recess portions,
wherein the first base in combination with the second base define an external surface of the mobile terminal.

14. The terminal of claim 13, further comprising a battery mounting portion to mount a battery therein,
wherein the case is configured to cover the battery mounting portion, and
wherein the light source is disposed adjacent to the battery mounting portion.

15. The terminal of claim 13, wherein the case forms a front case of the terminal, and
wherein the light source is located adjacent to the front case.

16. The terminal of claim 13, further comprising a printed circuit board having a controller mounted within an inner space defined by the case,
wherein the controller is configured to control the light source upon reception of a wireless communication signal or a control command.

17. The terminal of claim 13, wherein a prism is located between at least one light source and the plurality of recess portions to disperse light emitted from the light source.

18. The terminal of claim 13, wherein the plurality of recess portions includes:
a first region of recess portions adjacent to the light source; and
a second region of recess portions located farther away from the light source than the first region,
wherein the number of recess portions in the first region is smaller than the number of recess portions in the second region.

19. The terminal of claim 13, wherein the plurality of recess portions includes:
a first region of recess portions adjacent to the light source; and
a second region of recess portions located farther away from the light source than the first region,
wherein a width of each recess portion formed in the first region is narrower than a width of each recess portion formed in the second region.

20. A method for fabricating a case of a mobile terminal comprising:
forming a first base having a plurality of recess portions in a first surface thereof;
forming a second base having a first surface facing the plurality of recess portions so as to form empty spaces defined by the plurality of recess portions and the first surface of the second base; and
coupling the first and second bases to each other,
wherein the forming of the first base includes one of depositing a material cured by ultraviolet ray (UV) irradiation on a mold having a plurality of protrusions corresponding to the plurality of recess portions and forming the plurality of recess portions by cutting the first surface of the first base, and
wherein the first base in combination with the second base define an external surface of the mobile terminal.

21. The method of claim 20, further comprising providing a reflection layer on the second base.

* * * * *